(12) United States Patent
Vonfelden et al.

(10) Patent No.: US 8,663,743 B2
(45) Date of Patent: Mar. 4, 2014

(54) RELEASE COATING

(75) Inventors: Robert Scott Vonfelden, Concord, CA (US); John Kokoszka, Atlanta, GA (US)

(73) Assignee: Eco-Friendly Solutions, LLC, San Juan Capistrano, CA (US)

( * ) Notice: Subject to any disclaimer, the term of this patent is extended or adjusted under 35 U.S.C. 154(b) by 94 days.

(21) Appl. No.: 13/252,983

(22) Filed: Oct. 4, 2011

(65) Prior Publication Data

US 2012/0263881 A1    Oct. 18, 2012

Related U.S. Application Data

(60) Provisional application No. 61/390,088, filed on Oct. 5, 2010.

(51) Int. Cl.
*B05D 3/02* (2006.01)

(52) U.S. Cl.
USPC .............................. 427/387; 427/391; 427/395

(58) Field of Classification Search
None
See application file for complete search history.

(56) References Cited

U.S. PATENT DOCUMENTS

| | | |
|---|---|---|
| 2,462,242 A | 2/1949 | Webb et al. |
| 2,606,510 A | 8/1952 | Collings |
| 3,220,972 A | 11/1965 | Lamoreaux |
| 4,423,095 A | 12/1983 | Blizzard |
| 4,448,815 A | 5/1984 | Grenoble et al. |
| 4,454,266 A | 6/1984 | Coughlan et al. |
| 4,576,999 A | 3/1986 | Eckberg |
| RE32,245 E | 9/1986 | Grenoble et al. |
| 4,699,813 A | 10/1987 | Cavezzan |
| 4,741,966 A | 5/1988 | Cavezzan |
| 5,108,782 A | 4/1992 | Reed |
| 5,138,012 A | 8/1992 | Riding et al. |
| 5,708,075 A | 1/1998 | Chung et al. |
| 5,858,551 A | 1/1999 | Salsman |
| 5,958,601 A | 9/1999 | Salsman |
| 6,159,602 A | 12/2000 | Kadokura et al. |
| 6,410,134 B1 * | 6/2002 | Park et al. ............. 428/336 |
| 6,734,217 B1 | 5/2004 | Herrmann et al. |
| 2005/0123704 A1 * | 6/2005 | Sakai et al. ............. 428/40.1 |
| 2006/0191654 A1 | 8/2006 | Theisen et al. |
| 2006/0228480 A1 * | 10/2006 | Lin ......................... 427/275 |
| 2011/0183566 A1 | 7/2011 | Feder et al. |

FOREIGN PATENT DOCUMENTS

| | | |
|---|---|---|
| EP | 0 057 459 A1 | 8/1982 |
| EP | 0 057 459 B1 | 8/1982 |
| EP | 0 188 978 A1 | 7/1986 |
| EP | 0 188 978 B1 | 7/1986 |
| EP | 0 190 530 A1 | 8/1986 |
| EP | 0 190 530 B2 | 8/1986 |
| WO | WO-2008/019953 A1 | 2/2008 |
| WO | WO-2010/012787 A2 | 2/2010 |
| WO | WO-2010/012787 A3 | 2/2010 |
| WO | WO-2012/047929 A1 | 4/2012 |

OTHER PUBLICATIONS

Hawley's Condensed Chemical Dictionary Twelfth Edition, 1993, pp. 507-508, definition of fatty acid.*
International Search Report mailed Feb. 14, 2012, for PCT Application No. PCT/US2011/54816, three pages.

* cited by examiner

*Primary Examiner* — Erma Cameron
(74) *Attorney, Agent, or Firm* — Morrison & Foerster LLP

(57) ABSTRACT

Described herein is the use of a modified PET in combination with a vinyl addition silicone water-based release coating to provide performance equivalent to the silicone by itself at a lower cost than the silicone by itself and resulting in a release backing paper that can be repulped and recycled in conventional recycled paper mills avoiding the additional cost of sending the scrap paper to landfill.

11 Claims, No Drawings

RELEASE COATING

CROSS REFERENCE TO RELATED APPLICATION

This application claims the benefit of U.S. Provisional Application No. 61/390,088 filed on Oct. 5, 2010, the contents of which are incorporated by reference herein in their entirety for all purposes.

BACKGROUND OF THE INVENTION

Silicone-based release coatings are useful in applications where relatively non-adhesive surfaces are required. For example, pressure sensitive adhesive labels may have a backing sheet that has applied thereto a silicone-based coating to retain the labels without affecting the adhesive properties of the labels.

For example, for the preparation of pressure sensitive adhesive labels, a paper layer such as glassine, wood free paper or kraft paper, is coated with a silicone-based film. The silicone film is then adhered to by the adhesive material of the label stock. The silicone-based release film allows the adhesive material of the label stock to be easily removed and for the label stock to still retain its adhesive characteristics.

The typical methods for providing release papers for adhesives is based on three chemistries: silicone, chrome complex and polyethylene (PE). None of these treatments allow the backing paper to be recycled.

In addition, there are three different silicone types: solvent based, solventless or water-based. Solvent based technology requires a solvent recovery system so that the solvent does not escape to the environment causing pollution and to make the process economical. Solventless technology is expensive and the catalyst can be easily inactivated by minor contaminants. Solvent-based and solventless technologies both produce a backing paper which is not repulpable or recyclable. Water-based silicone technology can provide performance for a broad range of adhesives, but the resulting backing paper is not repulpable or recyclable. The chrome complexes, some of which can be considered as having non-objection status from the FDA for food contact, still represent a potential environmental hazard because of their chromium content.

PE is not recyclable and like the chrome complex, does not provide performance to a broad range of adhesives, especially the more aggressive types.

Published PCT Application WO2008/019953 teaches a polyorganosiloxane based release coating composition which can be used to coat polyester films.

Published PCT Application WO 2010/012787 teaches a liquid silicone composition for coating a number of substrates, including polyethylene terephthalate type polymer films.

SUMMARY OF THE INVENTION

According to a first aspect of the invention, there is provided a release coating for a pressure sensitive adhesive product comprising:
  60-90% polyethylene terephthalate modified by the addition of carboxyl functional fatty acids and 10-40% water dispersible or emulsifiable silicone.

According to a second aspect of the invention, there is provided a method of applying a release coating onto a pressure sensitive adhesive product comprising:
  mixing 10-40% water dispersible or emulsifiable silicone with 60-90% polyethylene terephthalate modified by the addition of carboxyl functional fatty acids in the presence of a suitable catalyst, thereby producing a release coating; and
  applying the release coating to a suitable support.

DESCRIPTION OF THE PREFERRED EMBODIMENTS

Unless defined otherwise, all technical and scientific terms used herein have the same meaning as commonly understood by one of ordinary skill in the art to which the invention belongs. Although many methods and materials similar or equivalent to those described herein can be used in the practice or testing of the present invention, the preferred methods and materials are now described. All publications mentioned hereunder are incorporated herein by reference.

Described herein is the use of a modified PET in combination with a vinyl addition silicone water-based release coating to provide performance equivalent to silicone coatings at a lower cost than the silicone by itself and resulting in a release backing paper that can be repulped and recycled in conventional recycled paper mills, thereby avoiding the additional cost of sending the scrap paper to landfill.

According to a first aspect of the invention, there is provided a release coating for a pressure sensitive adhesive product comprising:
  60-90% polyethylene terephthalate modified by the addition of carboxyl functional fatty acids and 10-40% water dispersible or emulsifiable silicone.

According to a second aspect of the invention, there is provided a method of applying a release coating onto a pressure sensitive adhesive product comprising:
  mixing 10-40% water dispersible or emulsifiable silicone with 60-90% polyethylene terephthalate modified by the addition of carboxyl functional fatty acids in the presence of a suitable catalyst, thereby producing a release coating; and
  applying the release coating to a suitable support.

In other embodiments of the invention, the mixture may be 65-90% modified polyethylene terephthalate and 10-35% water dispersible or emulsifiable silicone.

Polyethylene terephthalate (PET) is used in most plastic beverage bottles. The coatings described herein employ a modified PET that it is dispersible in water so that it can be applied using conventional coating equipment as discussed herein. A method for preparing such a water-dispersible PET is described in U.S. Pat. No. 5,858,551 which is incorporated herein by reference in its entirety, particularly the sections describing the preparation of the water-dispersible PET. The modifications also affect the polymer properties such that it can be repulped when applied to paper packaging.

As discussed in U.S. Pat. No. 5,858,551, the carboxy functional compound preferably has at least two carboxyl groups. In preferred embodiments, the carboxy functional compound is selected from the group consisting of trimellitic acid, trimellitic anhydride, maleic acid (e.g., produced from maleic anhydride), fumaric acid and isophthalic acid.

Typical water-based silicone release coatings contain a reactive polymer dispersed in water; this polymer may contain another reactive polymer that will crosslink with the first polymer or the crosslinking polymer may be incorporated in a second material, for example, a catalyst, which is added to the reactive polymer prior to usage. The mixture of reactive polymer, reactive crosslinking polymer and catalyst are typically applied to the paper substrate using a paper coater. The resulting film is then dried and cured using ovens and/or IR heaters. It is noted that such water-based silicone release coatings are well known in the art. Exemplary examples are described in a number of patents, including but by no means limited to U.S. Pat. No. 5,138,012; U.S. Pat. No. 6,734,217; U.S. Pat. No. 2,606,510; U.S. Pat. No. 2,462,242; U.S. Pat. No. 4,448,815; U.S. Pat. No. 4,576,999; U.S. Pat. No. 5,108,782; U.S. Pat. No. 4,423,095 and U.S. Pat. No. 4,454,266.

As will be apparent to one of skill in the art, water based silicone coatings are preferred within the invention because the water based silicone coatings are miscible with the water-dispersible PET described above.

Preferably, the water-based silicone release coating is an aqueous emulsion of polyorganosiloxanes and an aqueous emulsion catalyst, for example, a platinum catalyst. More preferably, the aqueous emulsion of polyorganosiloxanes is a mixture of polyorganosiloxanes, water, propylene glycol and polydimethyl (methyl hydrogen) siloxane and the aqueous emulsion catalyst is a mixture of polyorganosiloxanes, water, an emulsifying agent, propylene glycol and a platinum complex.

As noted above, the modified PET is a PET-containing polymer that has been chemically modified with the addition of carboxyl functional fatty acids. Specifically, the modified PET is a water dispersible and redispersible hydrophilic polyester resin derived from PET or recycled PET and has improved hydrophobicity and/or non-polar characteristics, as described in U.S. Pat. No. 5,858,551. As discussed therein, the polyester resins have a general formula of: $I_n$-P-$A_m$ wherein I is the ionic group, n is an integer of 1-3, P is a polyester backbone, A is an aliphatic group and m is an integer of 3-8. PET content can vary from 30-80% though 40-60%, 50-60% or 40-50% is preferred. Due to the carboxyl functionality on the modified PET, the modified PET is self emulsifying when it is mixed with water that contains a base. Various bases can be used, but ammonia is preferred because it is fugitive; i.e., when the coating is heated, the ammonia vaporizes leaving a durable surface that is not easily adhered to by adhesives.

For use, the catalyst is mixed with the silicone water-based coating. To this mixture the modified PET is added with agitation in the desired ratio to blend the two materials. This mixture is then applied to a paper surface or other suitable support using similar techniques known in the art for silicone coatings.

Silicone paper coatings are very expensive; however, by virtue of using a mixture of silicone and PET, there is a significant reduction in the cost of the release coating. In addition, the coated paper can be repulped and recycled, resulting in a significant income stream to the converter rather than a cost for sending the material to a landfill.

The instant invention is designed to replace the alternative methods known in the art by providing performance to aggressive and standard adhesives while having the added advantage of being repulpable and recyclable. Adhesive strength is determined by measuring the force in g/in required to remove the adhesive backed pressure sensitive label or decorative top sheet. It is of note that 'prime' release is considered to require 5-15 g/in, 'medium' release requires 15-150 g/in while 'high' release requires 150-500 g/in.

Pressure sensitive adhesives are used in a number of applications. For example, they are used in applications such as name tags that utilize adhesives that are temporary and/or don't have strong adhesive characteristics. They can also be used with an adhesive that will have to permanently bond to the substrate once the protective backing paper is removed. Each application may require a different release surface in order to maximize performance economically. These categories are typically known as Repositionable, Reusable or Permanent Labels.

It is known in the industry that the typical coatings (e.g., silicone, chrome complex or PE) that are used in the various applications are not repulpable or recyclable. The current manufacturers and users have to send cut waste/matrix from the manufacturing process and used backing paper to landfill or to an incinerator to dispose of them.

In some embodiments, the modified PET has a recycled plastic content of 40-45% and a renewable content (i.e., non-petroleum based) of 20-25%.

A non-recyclable backing paper has a significant cost: the backing paper has to be sent to landfill or be incinerated; this becomes a cost to the producer of the backing paper and the user of the final sandwich of backing paper, release coating, adhesive and label stock; this additional cost will ultimately be reflected in the cost of the end product that utilizes the backing paper. If the backing paper can be sent back to a recycled paper mill, the producer of the scrap would be paid for this product.

As will be apparent to one knowledgeable in the art, there are a wide range of adhesives that utilize a release backing paper, depending on the application. The release coating described herein will provide performance that will be acceptable from a release perspective for all adhesive classes, but also provide a backing paper that can be repulped and recycled.

A suitable silicone catalyst is also added. It is noted that such catalysts are well known in the art. In a preferred embodiment, the catalyst is platinum or platinum-based. Exemplary examples of such catalysts include but are by no means limited to those described in U.S. Pat. No. 3,159,602; U.S. Pat. No. 3,220,972; European Patent 0,057,459; European Patent 0,188,978; and European Patent 0,190,530.

It has been found that when the modified PET as described above is mixed with a commercially available water-based silicone release coating based on rare metal (e.g., platinum complex) addition catalysts as discussed above, release equivalent to that obtained with silicone, PE or chrome complex can be achieved when using 10-40% by weight of the silicone (on a dry basis) and 90-60% of the modified PET (on a dry basis). It is believed that other silicone cure chemistries will exhibit the same performance when utilized with the modified PET described above. In addition, these mixtures, unlike the pure silicone, will be repulpable and recyclable.

While not wishing to be bound to a particular hypothesis or theory, it is believed that the fatty acid modified PET orients at the surface of the paper so that the fatty acid faces away from the paper providing a low surface energy film to which the adhesive can't adhere. The modified PET is compatible with the water-based silicone, as discussed above.

The invention described herein is directed to release backings for various pressure sensitive release applications. Pressure sensitive release papers are used in a number of applications. These include the simple and non-demanding applications such as name labels that are individually removed and applied by an individual. A more demanding application would be the labels that are used to attach, for example, a FedEx or UPS label to the box or the plastic covers that are removed to close the box. The most complex applications are those in which the face or printed papers are removed by a robot and stuck to a surface. An example of this would be medallions and other paraphernalia that are applied to various consumer products such as autos, appliances and other commercial items.

As discussed herein, the described coating will perform equally to the prior art silicone coatings but also provide a backing paper that can be recycled and repulped.

In some embodiments, a base coat, for example, a typical pigment (for example but by no means limited to kaolin clay or other such inorganic material typically used in the paper industry) plus binder (for example a styrene-butadiene latex) is applied to the surface to be coated prior to the application of the PET/silicone coating. The ratio of pigment to binder can vary depending on substrate and performance requirements. In preferred embodiments, the ratio is between 3:1 and 1:3 pigment to latex solids.

In use, a commercially available silicone release emulsion and its catalyst are mixed together in the desired ratios. To this is added a prescribed amount of the modified PET as described above. This mixture of silicone and PET is then pumped to a coating station where it is applied to a paper substrate. In some embodiments, depending on the substrate, a basecoat such as the one described above is applied to the substrate prior to applying the mixture of modified PET and catalyzed silicone release coating. In some embodiments, the coated paper is dried and cured, for example, such that the coated surface achieves a temperature of about 100 C (min); it then must be cooled for example to about <45 C before it is taken to the reel. It is noted that these temperatures are intended for illustrative purposes and that other suitable temperatures will be readily apparent to one of skill in the art through routine experimentation.

This paper is then sent to a converting operation where an adhesive is applied to the back of a decorative face sheet which is then combined with the coated backer sheet. This operation results in some amounts of scrap paper or cut waste that can now be sent to a recycled mill rather than being burned or sent to landfill. As the product approaches the end market or ultimate user, waste from the processing or the remaining backing paper that can recovered from the process can also go to the recycle mill who will pay for this fiber source rather than going to landfill where the owner will have to pay to have it disposed of.

It is our understanding that typical silicone, QUILON™ (chrome complex—DuPont) or PE backing papers cannot be recycled. For the silicone, when recycled they may cause spots on the resulting paper and/or build up on the paper machine. QUILON™ could be a problem because of its chromium content; certain oxidative states of chromium are highly toxic and a paper mill would not want to introduce this potential hazard into its process. PE laminated backing papers not repulpable; if a PE film is used as the backing, it could be recycled into plastic film. The above-described PET/silicone combinations are fully repulpable and recyclable.

While the preferred embodiments of the invention have been described above, it will be recognized and understood that various modifications may be made therein, and the appended claims are intended to cover all such modifications which may fall within the spirit and scope of the invention.

What is claimed is:

1. A method of applying a release coating onto a pressure sensitive adhesive product comprising:

mixing 10-40% water dispersible or emulsifiable silicone with 60-90% polyethylene terephthalate modified by the addition of a carboxyl functional fatty acid, trimellitic acid, trimellitic anhydride, maleic acid, fumaric acid, isophthalic acid, or any combinations thereof, in the presence of a catalyst, thereby producing a release coating; and applying the release coating to a support.

2. The method according to claim 1 wherein 65-90% modified polyethylene terephthalate and 10-35% water dispersible or emulsifiable silicone are mixed.

3. The method according to claim 1 wherein the 60-90% polyethylene terephthalate is modified by the addition of trimellitic acid, trimellitic anhydride, maleic acid, fumaric acid or isophthalic acid.

4. The method according to claim 1 wherein the water dispersible or emulsifiable silicone comprises an aqueous emulsion of polyorganosiloxanes and an aqueous emulsion catalyst.

5. The method according to claim 4 wherein the aqueous emulsion catalyst is a platinum catalyst.

6. The method according to claim 4 wherein the aqueous emulsion comprises propylene glycol.

7. The method according to claim 4 wherein the aqueous emulsion catalyst comprises an emulsifying agent, propylene glycol and a platinum complex.

8. The method according to claim 1 wherein the support is a paper substrate.

9. The method according to claim 8 wherein the paper substrate is heated until the coated surface of the paper substrate achieves a temperature of about 100° C.

10. The method according to claim 1 wherein the 60-90% polyethylene terephthalate is modified by the addition of a carboxyl functional fatty acid.

11. The method according to claim 1 wherein the maleic acid is produced from maleic anhydride.

\* \* \* \* \*